R. HAWKINS.
Bee Hive.
No. 27,980.
Patented April 24, 1860.
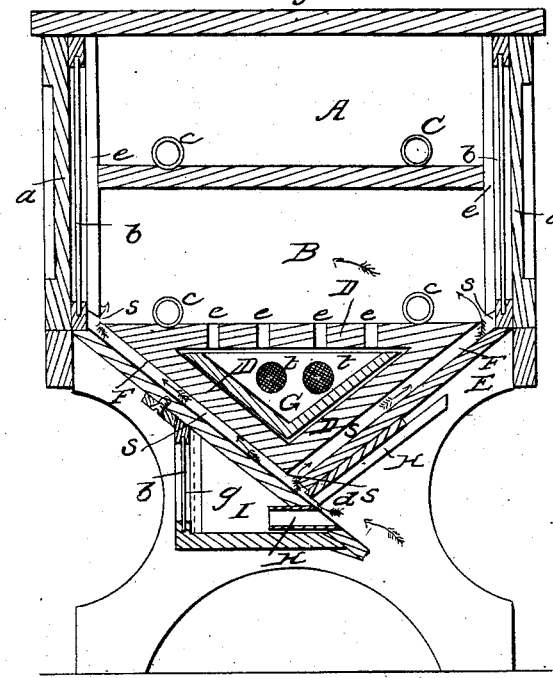
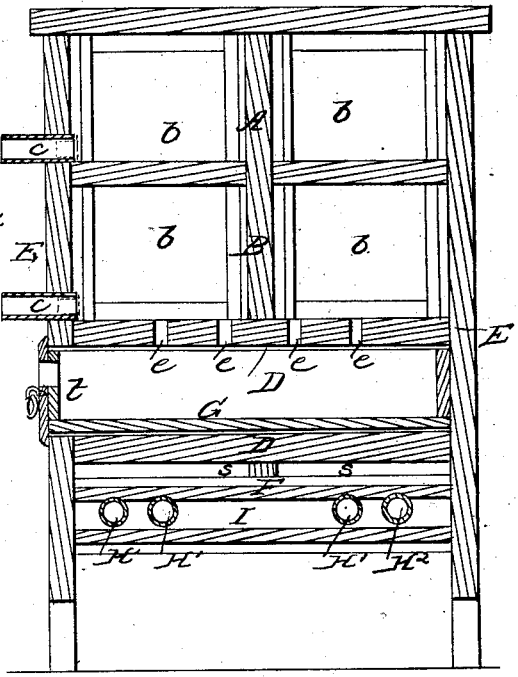
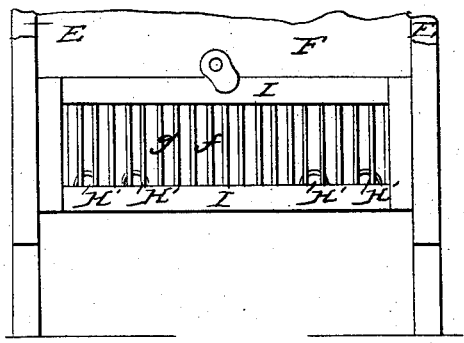
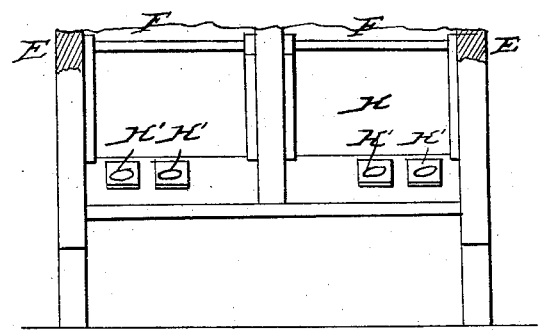
Witnesses
Goodwin V adSee
R. W. Fenwick
Inventor:
Robert Hawkins

UNITED STATES PATENT OFFICE.

ROBERT HAWKINS, OF BEALLSVILLE, PENNSYLVANIA.

BEEHIVE.

Specification of Letters Patent No. 27,980, dated April 24, 1860.

*To all whom it may concern:*

Be it known that I, ROBERT HAWKINS, of Beallsville, in the county of Washington and State of Pennsylvania, have invented a new and useful Improvement in Beehives; and I do hereby declare that the following is a full, clear, and exact description of the same, reference being had to the accompanying drawings, forming a part of this specification, in which—

Figure 1, is a transverse section of my improved beehive. Fig. 2, is a longitudinal section of the same. Fig. 3, is a front view of the lower part of the same, and Fig. 4, is a rear view of the lower part of the same.

Similar letters of reference, in each of the several figures indicate corresponding parts.

My invention consists in the construction of a trap for catching drone bees, robber bees and the miller, as hereinafter described.

To enable others, skilled in the art, to make and use my invention, I will proceed to describe its construction and operation.

My hive is constructed with two compartments, A, B, and has doors $a$, $a$, at its back and front. It also has removable glass panels $b$, $b$, between the doors and the working chambers, so that the bees may be readily inspected, and the honey removed. At one side of the hive and leading into each chamber, are arranged long tubes $c$, $c$, which are provided with a removable plug or stopper. These tubes are opened at their plugged ends whenever it is desirable to have the bees pass through them from the hive. By using long tubes, the bees have less chance to cluster on the side of the hive than what they have in those hives which simply have holes cut through their side.

The bottom D, of the lower chamber of the hive is made, in its transverse section, of V shape, and is suspended from the end boards of the casing E, in a V shaped extension F, so that an ingress, passage $s$, for the bees shall exist between it and the extension, from one end of the casing to the other, as represented; said passage communicating with a long narrow opening $d$, formed at the lower part of one of the inclined sides of the V shaped extension F. By thus constructing the bottom of the lower chamber, I am enabled to nearly fill up the V space which exists below the point where the bees begin to work, and at the same time secure a free pass for the bees at both of the side edges of the bottom after they have entered at the opening $d$. It is a very important object to thus fill up the V space of the extension F, for if the space be left open, the bees in cold weather are exposed to the cold air and in order to keep warm, seek a place at the top of the hive and the consequence is, the lower portion of the comb in the lower chamber is left exposed to the depredations of the enemies of the bees, and the moth soon makes it appearance. Now by only having openings at the side edges of the bottom D, and center of the V extension F, the bees will only be subjected to the cold air at the side edges of the bottom D, and therefore will not be compelled to retreat from the lower chamber to the upper in order to be comfortable, and therefore they are in a position to defend themselves from their enemies that may seek to enter at the side edges of the bottom of the lower chamber.

In order to feed the bees within the hive during cold weather, I construct the V shaped bottom hollow from end to end and have a V shaped drawer G, slide in the hollow of the same. This drawer enters through an opening in one end of the casing corresponding in shape with the shape of the V shaped hollow in the bottom; passages $c$, $c$, are provided in the bottoms of the upper and lower chambers for the bees to pass down into the feed drawer. Wire gauzed covered ventilation passages $t$, are also provided in the front board of the feed drawer so that fresh air may be admitted into the chambers of the hive, said air circulating through the passages $c$, $c$.

At the egress passage $d$, I arrange a cut off strip H, so that the bees may be confined at certain seasons of the year. And just below the passage, I arrange a series of tubes H′, H′, and in rear of said tubes I arrange a triangular shaped chamber I, for the purpose of entrapping millers and the drone and robber bees. The tubes are not peculiar either in construction or location, but the trap or chamber I, so far as the combination of the grating $f$, with the removable glass plate $g$, in front of the same, is concerned, I believe is novel, inasmuch as it can, by removing the glass, be used at all times as a drone trap without any danger of imprisoning the working bees, and by replacing the glass can be used at certain periods for catching robber bees and the miller.

The operation of the hive and trap is as follows: The cut off strip is raised high enough to admit the working bees, but not drones, and the glass plate removed from in front of the grating of the trap. The bees enter the opening $d$, and pass into the working chambers by means of the passage $s$. The drone bees not being able to enter the opening $d$, and in seeking to find an entrance, pass through the tubes into the trap. Now in case any working bees accidentally pass into the trap, they have a chance to escape through the grating, which has its bars set far enough apart to allow them, but not the drones, free egress.

At those seasons when the miller and robber bee hover round the hive, the glass plate is placed in front of the grating and, if it is desired to catch robber bees, the cut off strip is lowered for a short time, and they will, in seeking to find an entrance to the hive, pass into the trap in numbers and thus place themselves in a position to be killed by the apiarian. The miller is entrapped in like manner and thus prevented from laying moth eggs in places where destruction to the honey would ensue in due season.

What I claim as my invention and desire to secure by Letters Patent, is—

The trap I, when constructed with a stationary grating $f$, and a removable glass window $g$, at its back, and arranged on a bee hive, as and for the purposes herein described.

The above specification of my improvement in bee hives signed by me this 23d day of December 1859.

ROBERT HAWKINS.

Witnesses:
   GOODWIN Y. AT LEE,
   R. W. FENWICK.